M. HOFMAN.
Coffee-Pots.
No. 133,582.
Patented Dec. 3, 1872.
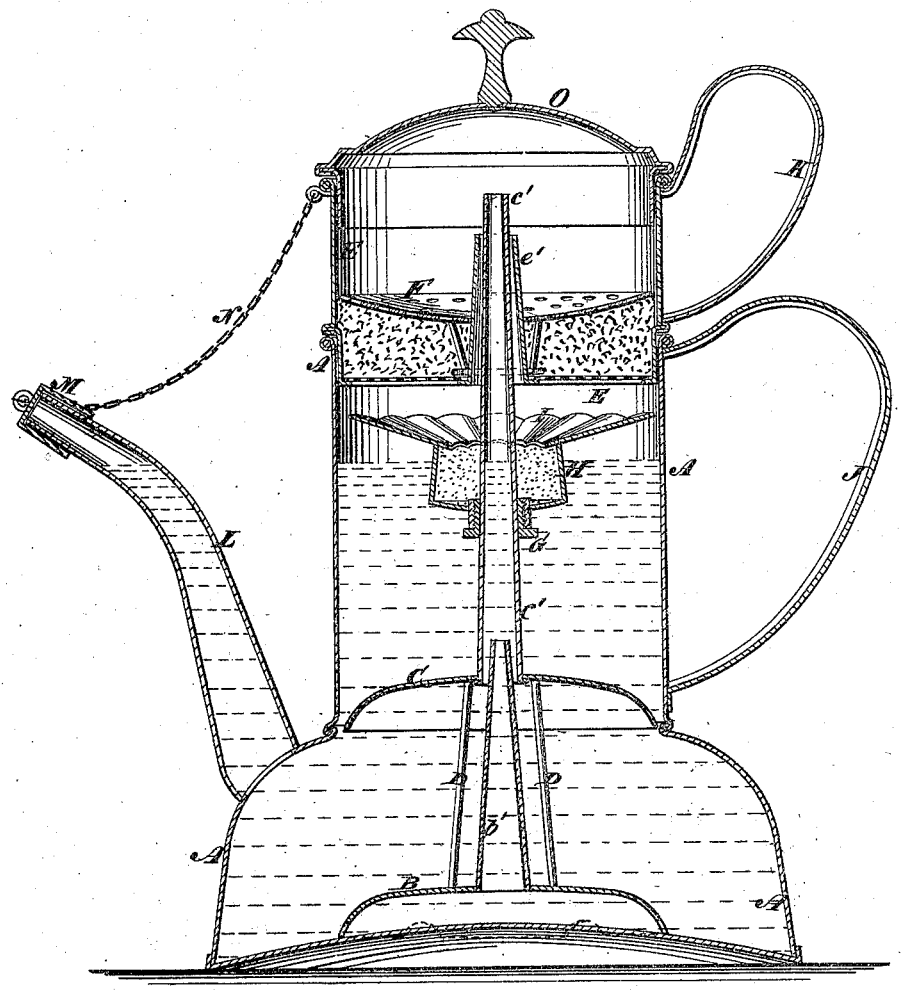

UNITED STATES PATENT OFFICE.

MARTIN HOFMAN, OF SAN FRANCISCO, CALIFORNIA.

IMPROVEMENT IN COFFEE-POTS.

Specification forming part of Letters Patent No. 133,582, dated December 3, 1872.

*To all whom it may concern:*

Be it known that I, MARTIN HOFMAN, of San Francisco, in the county of San Francisco and State of California, have invented a new and useful Improvement in Coffee-Pot, of which the following is a specification:

The figure is a detail vertical section of my improved coffee-pot.

My invention has for its object to furnish an improved coffee-pot, simple in construction, convenient in use, and effective in operation, extracting the strength so thoroughly from the ground coffee that a much smaller quantity will be required than when an ordinary coffee-pot is used; and it consists in the body of the coffee-pot, the inverted funnels, the steeping-cup with its perforated bottom and tube, the perforated plate, and the trap-cup and its radially grooved or corrugated plate, said parts being constructed and arranged as hereinafter more fully described.

A represents the body of the coffee-pot, the upper part of which is made cylindrical in form, and the lower part is bulged or swelled, as shown in the figure. This construction, by expanding the base of the pot, exposes a larger surface to the action of the heater, and enables the coffee to be made much quicker. The bottom of the pot is concave so as to more thoroughly concentrate the heat. The coffee-pot may be used upon a stove or range, or over any desired kind of lamp or heater. The expansion or swell of the lower part of the pot A also prevents the water from boiling upward. B and C are inverted funnels. The funnel B rests upon the bottom of the body A, and its tube $b'$ enters the tube $c'$ of the funnel C. The funnel C is placed at the lower edge of the cylindrical part of the body A, and is connected with and supported from the funnel B by wires D, as shown in the drawing. E is the steeper, which is fitted into the mouth of the cylindrical part of the body A, and its bottom is finely perforated or made of fine wire-gauze. In the center of the perforated bottom of the cup or steeper E is formed a hole, in which is secured a tube, $e'$, through which the tube $c'$ of the upper funnel C passes, and which is made a little larger than said funnel-tube, so that steam may pass up between them. F is a perforated plate with a hole through its center for the passage of the tubes $c'$ $e'$, and which is designed to be placed upon the coffee in the cup E, and hold it down evenly and smoothly, so that the water may act upon and leach the coffee evenly. To the tube $c'$, a little below the bottom of the cup E, is secured a flanged collar, G, upon the outer surface of which is cut a screw-thread, which screws into a nut secured in the bottom of the cup H. To the upper edge or mouth of the cup H is attached a plate, I, which is corrugated or grooved radially, and which has a hole through its center larger than the tube $c'$ and smaller than the mouth of the cup H. The plate I is designed to receive the fine particles of ground coffee that may pass through the perforated bottom of the cup E, and conduct said fine particles into the cup H, the inwardly-projecting edge of the plate I keeping said particles from flowing out when the coffee-pot is inclined in pouring out coffee. The manner in which the cup H is secured to the tube $c'$ allows it to be conveniently detached to be emptied and cleaned. The body A and cup E are provided, respectively, with handles J K. L is the pouring-spout, which projects from the breast or swell of the body A, and is provided with a cap, M, to confine the steam while preparing the coffee, and which should be connected with the cup E or body A by a small chain, N, to prevent it from being lost. O is the cover, which is so formed as to fit into the mouth of the cup E or body A, as may be desired.

In using the coffee-pot, the ground coffee is placed in the cup E and the plate F placed upon it; then, as the water becomes heated, it is forced up through the tubes $b'$ $c'$, flows upon the plate F, and percolates through the coffee, wholly removing its strength in a very short time, the plate I and cup H catching any fine coffee that may pass through the bottom of the cup E, so that the coffee will always pour out clear.

Having thus described my invention, I claim as new and desire to secure by Letters Patent—

The body A, inverted funnels B $b'$ C $c'$, cup E made with a perforated bottom and provided with a tube, $e'$, perforated plate F, detachable cup H, and plate I corrugated or grooved radially, said parts being constructed and arranged in connection with each other, substantially as herein shown and described, and for the purpose set forth.

MARTIN HOFMAN.

Witnesses:
J. C. HABERLING,
FRIEDRICH SCHOENER.